United States Patent
Lewin et al.

(10) Patent No.: US 7,200,681 B1
(45) Date of Patent: Apr. 3, 2007

(54) EDGE SIDE COMPONENTS AND APPLICATION PROGRAMMING ENVIRONMENT FOR BUILDING AND DELIVERING HIGHLY DISTRIBUTED HETEROGENOUS COMPONENT-BASED WEB APPLICATIONS

(75) Inventors: Daniel M. Lewin, deceased, late of Charlestown, MA (US); by Anne E. Lewin, legal representative, Charlestown, MA (US); Mark Tsimelzon, Sunnyvale, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

(21) Appl. No.: 10/208,478

(22) Filed: Jul. 30, 2002

Related U.S. Application Data

(60) Provisional application No. 60/308,888, filed on Jul. 30, 2001.

(51) Int. Cl.
*G05F 15/173* (2006.01)
(52) U.S. Cl. .................................................... 709/246
(58) Field of Classification Search ................ 709/246, 709/232, 230
See application file for complete search history.

(56) References Cited

U.S. PATENT DOCUMENTS 6,477,575 B1 * 11/2002 Koeppel et al. ............ 709/224
6,640,240 B1 * 10/2003 Hoffman et al. ............ 709/203

OTHER PUBLICATIONS

Oracle Corporation and Akamai Corporation, all pages in Overview Section, 2001.*

* cited by examiner

*Primary Examiner*—David Y. Eng
(74) *Attorney, Agent, or Firm*—David H. Judson

(57) ABSTRACT

A method is provided for processing an application on an edge server, wherein the application comprises a set of defined presentation, code and data components, each of which are preferably URI-addressable objects. In response to a client request, the presentation, code and data components are processed according to a set of metadata to generate a response, and the response is delivered to the client. The presentation components are typically content such as HTML fragments, WML fragments, or some combination thereof. The code components are typically Java servlets or beans, XSLT style sheets, or some combination thereof. The data components are typically XML files, native database formatted files, and the like. Each of the presentation, code and data components may have a distinct management profile, cacheability profile, deployment profile, invalidation profile, and security profile. These profiles are settable via metadata or other similar means. Using this framework, heterogenous components may be composed into other components and complete applications or services.

19 Claims, 4 Drawing Sheets

602   604   605

606   608

610   612   613

616   614   618

620

EDGE SIDE COMPONENTS AND APPLICATION PROGRAMMING ENVIRONMENT FOR BUILDING AND DELIVERING HIGHLY DISTRIBUTED HETEROGENOUS COMPONENT-BASED WEB APPLICATIONS

This application is based on and claims priority from Provisional Application Ser. No. 60/308,888 filed Jul. 30, 2001.

This application contains subject matter protected by copyright. All rights reserved.

BACKGROUND OF THE INVENTION

1. Technical Field

The present invention relates generally to a platform for building and delivering highly distributed heterogeneous component-based Web applications. Applications are delivered from the "edge" of the Internet, e.g., by content delivery networks and reverse proxy caches. The platform can be used to deliver both traditional Web applications and Web services.

2. Description of the Related Art

Today's web sites and application builders face an ever-increasing number of challenges. Chief among them are the following: performance, scalability, reliability, security, ease of deployment and management, openness, and cost. In particular, applications have to support large numbers of requests per second, without increasing request latency. Applications have to be able to scale to meet peak demands. Unexpected hardware, software, and Internet failure issues have to be dealt with. The access to enterprise applications and data must be strictly controlled. It must be easy to deploy and manage applications across multiple servers. Application developers do not want to be locked in into vendor-specific standards. Applications have to be built, deployed, and managed in a cost-effective manner. The emerging field of Web Services will quickly face the very same challenges.

Content delivery networks (CDNs) and caches are designed to help with some of these problems. Unfortunately, there is currently no comprehensive programming model available that would addresses all of the above challenges. ESI (http://www.edge-delivery.org/spec.html) is the first standard for doing this, but it only addresses the presentation layer of the Web application.

It would be desirable to extend ESI to let developers build and deploy complete Web sites, applications, and services.

BRIEF SUMMARY OF THE INVENTION

The present invention provides an edge side components and application programming environment for building and delivering highly distributed heterogeneous component-based Web applications. Such applications are delivered from the "edge" of the Internet, e.g., by content delivery networks and/or reverse proxy caches. The inventive platform can be used to deliver both traditional Web applications and Web services.

A technical advantage of the present invention is the provision of an architecture that specifies how various presentation, data and code components that comprise a Web application or service can be deployed, invalidated, cached, and managed at an edge server. In an illustrative embodiment, a data structure, such as a set of metadata, is used for this purpose.

It is a more general object of the invention to use a composition language on an edge server to control how code, data and presentation components of an application are combined to generate an output in response to a client request. In an illustrative embodiment, the composition language is ESI and, thus, the invention provides for an ESI extension.

According to one aspect of the invention, a method is provided for processing an application on an edge server, wherein the application comprises a set of defined presentation, code and data components, each of which are preferably URI-addressable objects. In response to a client request, the presentation, code and data components are processed according to a set of metadata to generate a response, and the response is delivered to the client. The presentation components are typically content such as HTML fragments, WML fragments, or some combination thereof. The code components are typically Java servlets or beans, XSLT style sheets, or some combination thereof. The data components are typically XML files, native database formatted files, and the like. Each of the presentation, code and data components may have a distinct management profile, cacheability profile, deployment profile, invalidation profile, and security profile. These profiles are settable via metadata or other similar means. A significant technical advantage of the system is the ability in which heterogenous components may be composed into other components and complete applications or services.

According to another aspect of the invention, a method of processing an application on an edge server is described, wherein the application comprises a set of defined presentation, code and data components, each of which are URI-addressable objects. In response to a client request, a composition language is used to combine the presentation, code and data components into a set of one or more derived components to generate a response. At least one of the components has a configurable profile selected from a set of profiles including a management profile, a cacheability profile, a deployment profile, an invalidation profile, and a security profile.

The foregoing has outlined some of the more pertinent features of the present invention. These features should be construed to be merely illustrative. Many other beneficial results can be attained by applying the disclosed invention in a different manner or by modifying the invention as will be described.

DETAILED DESCRIPTION OF THE PREFERRED EMBODIMENT

By way of background, it is known in the prior art to deliver digital content (e.g., HTTP content, streaming media and applications) using an Internet content delivery network (CDN). A CDN is a network of geographically-distributed content delivery nodes that are arranged for efficient delivery of content on behalf of third party content providers. Typically, a CDN is implemented as a combination of a content delivery infrastructure, a request-routing mechanism, and a distribution infrastructure. The content delivery infrastructure usually comprises a set of "surrogate" origin servers that are located at strategic locations (e.g., Internet network access points, Internet Points of Presence, and the like) for delivering content to requesting end users. The request-routing mechanism allocates servers in the content delivery infrastructure to requesting clients in a way that, for web content delivery, minimizes a given client's response time and, for streaming media delivery, provides for the highest quality. The distribution infrastructure consists of on-demand or push-based mechanisms that move content from the origin server to the surrogates. An effective CDN serves frequently accessed content from a surrogate that is optimal for a given requesting client. In a typical CDN, a single service provider operates the request-routers, the surrogates, and the content distributors. In addition, that service provider establishes business relationships with content publishers and acts on behalf of their origin server sites to provide a distributed delivery system.

Figure 1:
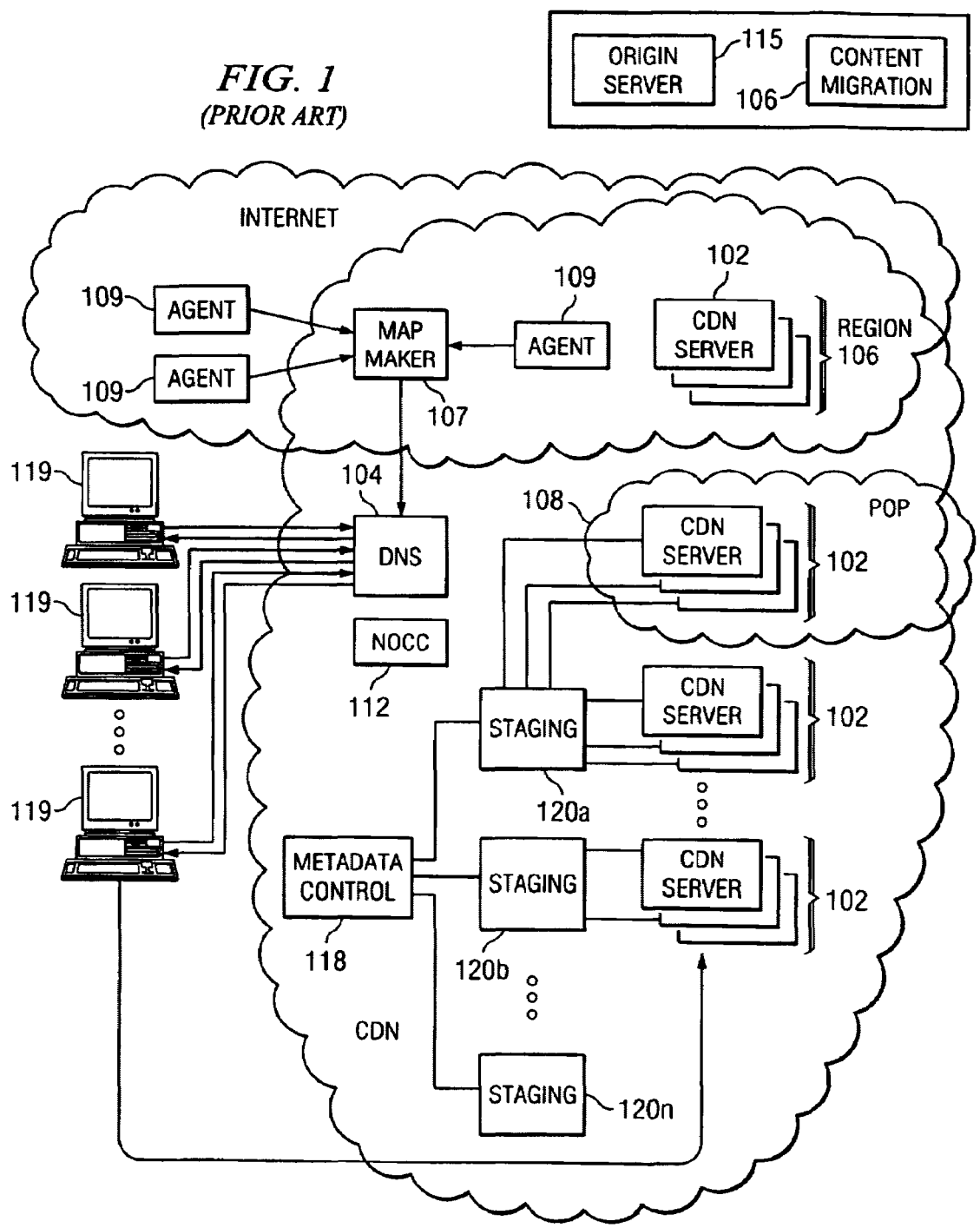
FIG. 1 is a block diagram of a known content delivery network in which the present invention may be implemented.

As seen in FIG. 1, an Internet content delivery infrastructure usually comprises a set of "surrogate" origin servers 102 that are located at strategic locations (e.g., Internet network access points, and the like) for delivering copies of content to requesting end users 119. A surrogate origin server is defined, for example, in IETF Internet Draft titled "Requirements for Surrogates in the HTTP" dated Aug. 9, 2000, which is incorporated herein by reference. The request-routing mechanism 104 allocates servers 102 in the content delivery infrastructure to requesting clients. The distribution infrastructure consists of on-demand or push-based mechanisms that move content from the origin server to the surrogates. A CDN service provider (CDNSP) may organize sets of surrogate origin servers as a group or so-called "region." In this type of arrangement, a CDN region 106 typically comprises a set of one or more content servers that share a common back-end network, e.g., a LAN, and that are located at or near an Internet access point. Thus, for example, a typical CDN region may be co-located within an Internet Service Provider (ISP) Point of Presence (PoP) 108. A representative CDN content server is a Pentium-based caching appliance running an operating system (e.g., Linux, Windows NT, Windows 2000) and having suitable RAM and disk storage for CDN applications and content delivery network content (e.g., HTTP content, streaming media and applications). Such content servers are sometimes referred to as "edge" servers as they are located at or near the so-called outer reach or "edge" of the Internet. The CDN typically also includes network agents 109 that monitor the network as well as the server loads. These network agents are typically co-located at third party data centers or other locations. Mapmaker software 107 receives data generated from the network agents and periodically creates maps that dynamically associate IP addresses (e.g., the IP addresses of client-side local name servers) with the CDN regions.

Content may be identified for delivery from the CDN using a content rewrite tool 106 operated, for example, at a participating content provider server. Tool 106 rewrites embedded object URLs to point to the CDNSP domain. A request for such content is resolved through a CDNSP-managed DNS to identify a "best" region, and then to identify an edge server within the region that is not overloaded and that is likely to host the requested content. Instead of using content provider-side migration (e.g., using the tool 106), a participating content provider may simply direct the CDNSP to serve an entire domain (or subdomain) by a DNS directive (e.g., a CNAME). In either case, the CDNSP may provide object-specific metadata to the CDN content servers to determine how the CDN content servers will handle a request for an object being served by the CDN. Metadata, as used herein, refers to a set of control options and parameters for the object (e.g., coherence information, origin server identity information, load balancing information, customer code, other control codes, etc.), and such information may be provided to the CDN content servers via a configuration file, in HTTP headers, or in other ways. The Uniform Resource Locator (URL) of an object that is served from the CDN in this manner does not need to be modified by the content provider. When a request for the object is made, for example, by having an end user navigate to a site and select the URL, a customer's DNS system directs the name query (for whatever domain is in the URL) to the CDNSP DNS request routing mechanism. Once an edge server is identified, the browser passes the object request to the server, which applies the metadata supplied from a configuration file or HTTP response headers to determine how the object will be handled.

As seen in FIG. 1, the CDNSP may operate a metadata transmission system 116 comprising a set of one or more servers to enable metadata to be provided to the CDNSP content servers. The system 116 may comprise at least one control server 118, and one or more staging servers 120a–n, each of which is typically an HTTP server (e.g., Apache). Metadata is provided to the control server 118 by the CDNSP or the content provider (e.g., using a secure extranet application) and periodically delivered to the staging servers 120a–n. The staging servers deliver the metadata to the CDN content servers as necessary.

Figure 2:
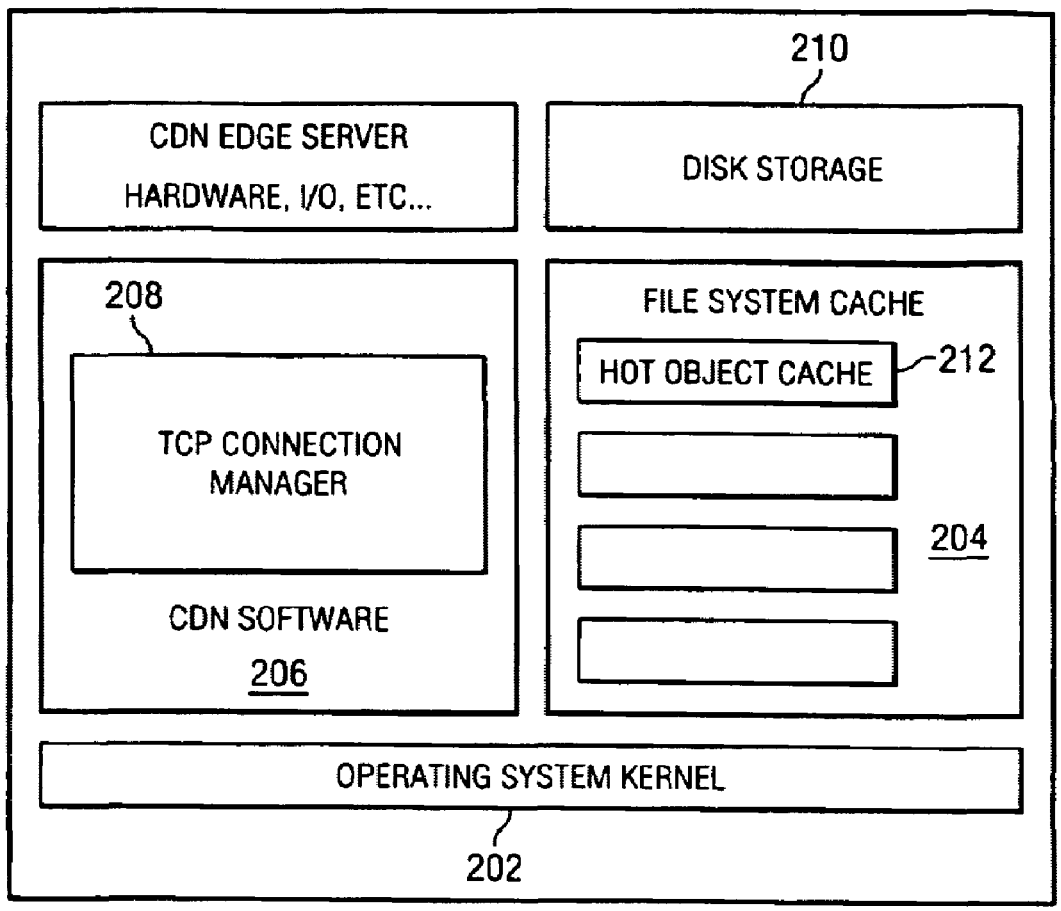
FIG. 2 illustrates a typical machine configuration for a CDN edge server.

FIG. 2 illustrates a typical machine configuration for a CDN content edge server. Typically, the content server 200 is a caching appliance running an operating system kernel 202, a file system cache 204, CDN software 206, TCP connection manager 208, and disk storage 210. CDN software 206 creates and manages a "hot" object cache 212 for popular objects being served by the CDN. It may also provide other CDN-related functions, such as request routing, in-region load balancing, and the like. In operation, the content server 200 receives an end user content request, determines whether an object requested is present in the hot object cache or the disk storage, serves the requested object via HTTP (if it is present), or, upon a cache miss, establishes a connection to another content server or an origin server to attempt to retrieve the requested object. Typically, the edge server operates in a "pull" manner, wherein an object is pulled into the cache initially upon the first request to the cache—which will generate a cache miss since the object is not present.

Figure 3:
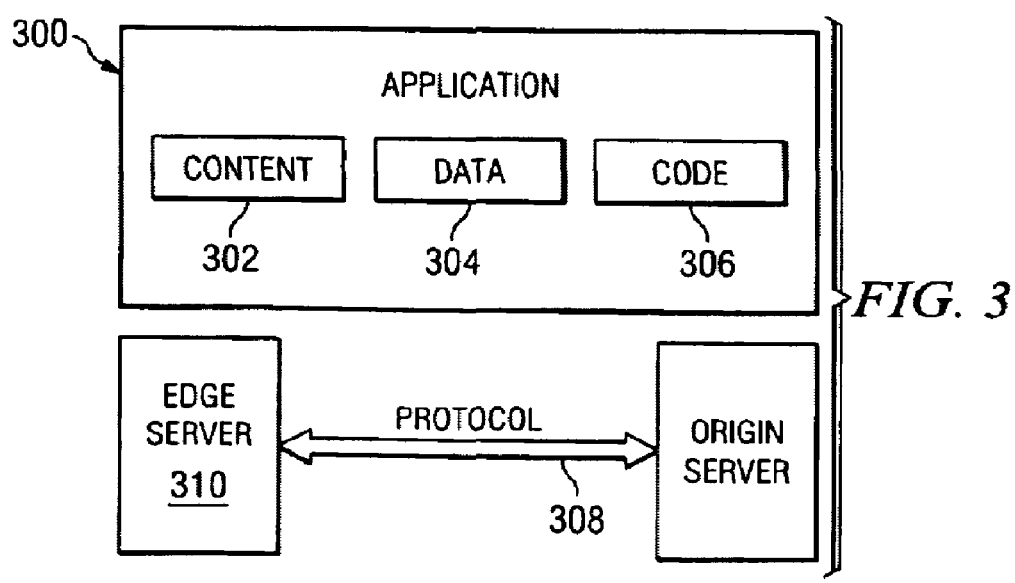
FIG. 3 illustrates how an application is composable from classes of components.

The inventive architecture is based on the following general concepts. Reference should be made to FIG. 3. An application 300 is said to consist of components, and, preferably, there are three main classes of components: presentation or "content" components 302 (e.g., HTML fragments, WML fragments, and the like), data components 304 (e.g., XML files, native database formats, and the like), and code components 306 (e.g., Java servlets or beans, XSLT style sheets, and the like). Preferably, a communications protocol 308 is provided to deploy components to the edge server 310, purge them from the edge, and exchange data between the edge and an origin 312. A single edge server and a single origin server is shown merely for illustrative purposes, of course. A technical advantage of the system comes from a number of ways to compose heterogeneous components into other components and complete applications. The simplest way to do composition is through the ESI language, but complex code execution runtimes like XSLT or JSP/servlets also fit nicely into the paradigm. More generally, any composition language may be used, such as Javascript, VbScript, C, C++, C#, PHP, and the like.

Caching is an integral part of building high-performance scalable applications. The application programming environment preferably provides different ways to specify a cache policy for each component, whether presentation, data or code. Cache policy is concerned with specifying when the component is allowed to be cached, what Time-To-Live (TTL) value should be, whether multiple versions need to be cached depending on some parameters (vary support). Preferably, presentation, code and data components can be cached. In one embodiment, the above properties of components, as well as many other aspects of system, are controlled through metadata. For all classes of components, the programming environment of the invention preferably defines metadata attributes, possible values, and the ways to associate metadata with the components.

Figure 4:
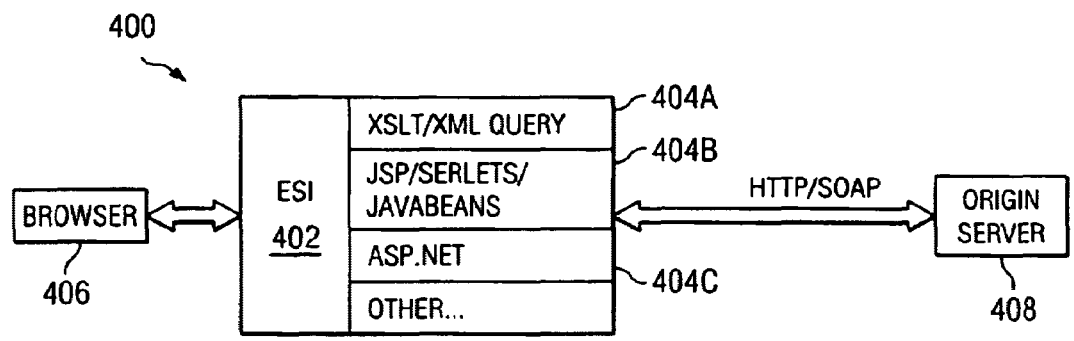
FIG. 4 illustrates an edge side components and application programming environment of the present invention.

FIG. 4 illustrates a preferred embodiment of a representative edge server that supports the edge side components and application programming environment of the present invention. Additional servers are provisioned in the same manner, of course. In this example, a server 400 provisioned according to the invention uses ESI 402 as the dispatcher and page assembly language, although as noted above any composition language may be used for this purpose. The server also provides native support for other execution environments 404a–n including, as merely illustrative, XSLT/XML Query 404a, Java 404b (e.g., JSP/Servlets/JavaBeans), asp.net 406c, and so forth. A client browser 406 is connectable to the server 400 in the usual manner, and the server 400 goes forward to an origin server 408 as needed. This architecture allows an application developer to use ESI (or some other composition language) to mix many different kinds of components in the same applications and in the same pages. For a homogenous application, a native presentation mechanism can be used. For example, a J2EE application running on the server may use ESI as its presentation, or it may use JSP directly. Regardless, the inventive architecture specifies how the components that make up the application can be deployed, invalidated, cached, and managed at the edge. This is now described in detail.

As noted above, components make up the foundation of the inventive system architecture and programming model. The platform enables developers to design Web applications and services as consisting of a number of various presentation, data and code components. For different kinds of components, the programming model provides a common framework to express the following properties: component definition, deployment protocol, invalidation protocol, cache policy, and security policy. Each of these properties is now described.

The component definition is preferably as follows. The programming model deals with basic components and derived components. A basic component preferably is a URI-addressable object that comes from some origin server. Sometimes, multiple components are bundled into a single URI-addressable package, like a .WAR file. A derived component represents the result of some processing performed by a server on one or more basic components. A derived component typically also has a URI associated with it. Most properties of the component are expressed through a data structure, such as a metadata template.

The deployment protocol preferably includes two models for deploying components: pull and push. The pull model is the primary way to deploy components to the servers. In this model, the component is pulled on demand into the server that requires it, typically by using either a SOAP request or an HTTP request. The push (also known as the publish) model provides a way to deploy some components to all or a subset of the servers. For example, a large XML file exported from a database can be pre-published in advance. A combination of protocols (FTP, HTTP, Rsync or the like) can be used for this purpose.

With respect to invalidation, most applications require an ability to purge or invalidate components from the edge server. The edge side components applications programming environment preferably includes a SOAP-based invalidation protocol for sending and forwarding of invalidation requests. Details of this invalidation protocol are set forth below.

Caching is an important part of the edge side components and application programming environment. Preferably, a cache policy is defined for every component, although this is not a requirement. As is well known, cache policy is concerned with specifying when the component is allowed to be cached, what time-to-live (TTL) value should be used, and whether multiple versions of the component should be cached. Preferably, presentation, code and data components can be cached.

Figure 5:
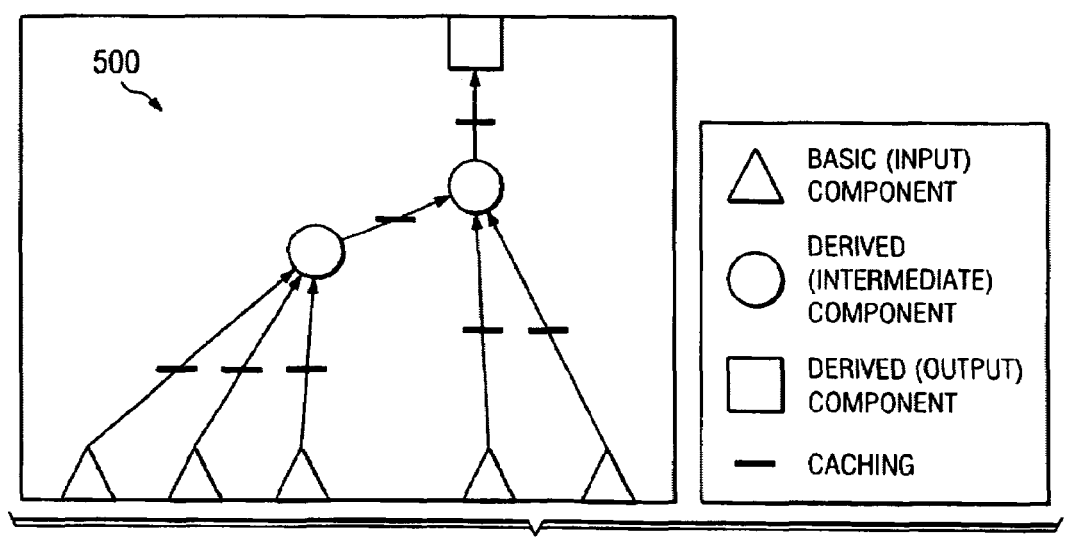
FIG. 5 illustrates the inventive processing model that is implemented by the edge side components and application programming environment of the present invention.

The platform also provides the ability to implement a security policy. In particular, the inventive framework provides ways to do access control for both basic and derived components. Both authentication and authorization can happen either at the origin or on the edge The inventive processing model is best represented as a tree, as illustrated by the diagram in FIG. 5. At the root of the tree 500 is output—the derived component requested by the end user. The leaves of the tree are inputs. According to the invention, the leaves of the tree are code, data, or presentation level components. The programming model defines how inputs are to be retrieved from origin servers. Processing occurs in the intermediate nodes of the tree. Typically, processing takes one code component and zero, one, or more data components as inputs. The results of processing are derived components, typically representing data or presentation. Caching occurs on the edges of the tree. Caching of code, data, and presentation components preferably is handled uniformly for different kinds of components. Preferably, all the components have access to the HTTP headers associated with the user request.

A technical advantage of the present invention comes from the different ways to combine basic components into derived components, and eventually into full-fledged web applications and services. The following are various paradigms for combining different presentation (P), data (D), and code (C) components at the edge server. They are illustrated in FIGS. 6A–6D.

$$P+P \rightarrow P$$

Figure 6A:
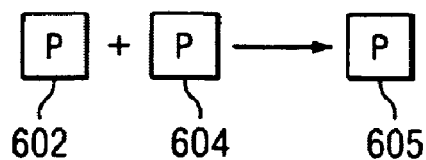
FIGS. 6A–6D illustrate different ways to combine basic components into derived components at the edge server according to the present invention.

As illustrated in FIG. 6A, the primary way to combine presentation components 602 and 604 together is to use, directly or indirectly, an ESI <esi:include> statement. Other platform-specific methods, such as <jsp:include>, can be either implemented directly, or replaced by <jesi:include> or mapped into <esi:include>.

C→P

Figure 6B:
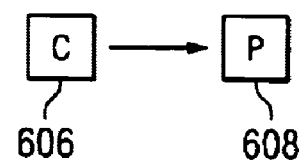

As illustrated in FIG. 6B, the simplest execution case of using a code component 606 is running it to produce a presentation component 608. Note that the resulting presentation component may (and typically will) require a separate caching policy. For example, the code (C) itself may be cacheable with TTL=1 month, while the resulting presentation (P) component may be cacheable with TTL=3 hours. The application environment of the invention supports various code execution environments, such as the ESI language as well as JSPs and servlets.

C+C→C

Figure 6C:
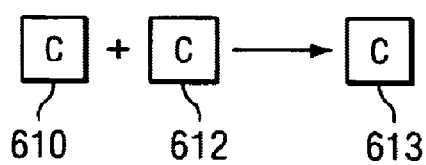

As illustrated in FIG. 6C, the platform also supports different ways to link code components 610 and 612, both on the edge and between the edge and the origin. Thus, for example, on the edge, the platform supports standard code linking paradigms such as using JavaBeans from JSPs and servlets; between the edge and the origin, preferably SOAP is used as the primary RPC mechanism.

D+C→P

D+C→D

Figure 6D:
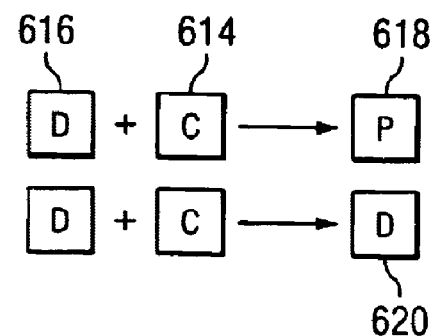

FIG. 6D illustrates how data components may be processed on the edge. The inventive framework preferably provides many ways to express this functionality. In the example shown, XSLT stylesheets (C) 614 are used to translate XML (D) 616 into HTML (P) 618 or another XML format (D) 620. In another example, XML Query can be used to extract values from XML files, JDBC and other native interfaces may be used, and so forth.

Although not meant to be limiting, data components on the edge server primarily live as XML files, although for optimization purpose native database formats may be supported. There are two primary ways of using data components on the edge: caching the full XML file on the edge, and then using XML Query or some other interface to query the XML file; and submitting queries over SOAP or some other native interface like JDBC to the database running at the origin. In both cases, query results preferably can be cached on the edge. The query string is then stored as a part of the cache key.

As noted earlier, preferably metadata is responsible for controlling many important aspects of component behavior. The preferred metadata forms are set forth below.

The platform defines the following ways to define and exchange metadata: HTTP headers, SOAP headers, and metadata files that are native to the application programming environment. HTTP headers allow web developers to associate specific metadata with the component being requested over HTTP. The framework supports the same HTTP headers as defined in the Edge Architecture Specification, which is described at the following URL http://www.edge-delivery.org/architecture spec 1-0.html. An example of an HTTP header would be Surrogate-Control: max-age="1d", content="JSP/1.2" which specifies that given component is a JSP 1.2 file, cacheable for one day. SOAP headers are similar to HTTP headers, but are used for components retrieved over SOAP. Application programming environment metadata files may also be transferred out-of-band through an appropriate metadata transport mechanism (e.g., mechanism 116 in FIG. 1) to allow developers to associate metadata with groups of components and to set up complex processing rules.

The edge side components and application programming environment preferably specifies a number of attributes that can be applied to a component. Representative attributes are: max-age—specifies the TTL; no-store—specifies that the component should not be cached; Content—specifies the kind of content. Examples: "ESI/1.0", "JSP/1.2"; Vary—specifies that multiple versions of the components are to be cached (e.g., values: "cookie:userid", "header:user-agent:os:version"); and fail-action—specifies the location of the default value of the component.

Metadata files define the applications, associate cacheability rules with groups of components, and set up component processing rules. Generally, there is one metadata file per application. Metadata files preferably are XML files, with the following being the most useful tags, explained here informally:

<application>
  // domain and path define what request URLs map into this applications.
  <domain>domain</domain>
  <path>path </path>
  // origin server for this application
  <origin>origin domain</origin>
</application>

<process> // defines a processing rule
  <name>name</name> // unique name of this processing rule
  // defines which URLs this processing applies to
  // matches can be combined with <and>, <or>, etc. as in RuleML.
  <match type="selector" value="value"/>
  // Specifies the processing to be applied.
  <apply>processing</apply> // could be ESI, XSLT, JSP, servlet, ASP.NET etc.
  // One or more inputs can be specified
  <input type="code" src="URL"/>
  // Code is a special input. It is the executable or the source for the processing
  // specified in <apply>. In the absence of <apply>, it controls what processing is to be applied.
  // Other input components can be specified and will be made available to the // processor.
  <input name="name"src="URL"/>
  //params are additional parameters that are made available to the processor
  <param name="name"value="value"/>
  // the difference between inputs and params is simple: inputs are components and params are simply name/value pairs. Unlike params, inputs may establish a dependency between a resulting derived component and an input component.
  // Metadata that can be applied to the result. Could be max-age, no-store, etc.
  <md name="name"value="value"/>
</process>

<associate>
  // defines which URLs this association applies to
  // matches can be combined with <and>, <or>, etc. as in RuleML.
  <match type="selector" value="value"/>
  // Metadata attributes that can be applied to the result.
  <md name="name"value="value"/>

</associate>

Selectors

Selectors are the predicates supported by the <match> tag. The <match> tag preferably has the following attributes:

type:
        "path"
        "path-prefix"
        "path-extension"
        "cookie-name"
        "cookie-name-value"
        IP range
        Requestor
    There may be a complication with naming derived components. In some cases, both the input component and the derived component are named the same. For example, foo.jsp is an input, but may also be the name of the output. To avoid this ambiguity, the <match> case can use the selector requestor. Possible values are: "user", "processor-type:type"; or "processor-name:name". Examples: <match type="requestor" value="user"> or <match type="requestor" value="processor-type:ESI"> or <match type="requestor" value="processor-name:foo">.
    value: the associated value. This could have multiple values, as in <match type="cookie-name-value" value="usertype:5">
    regexp: true/false (optional). If true, the value is treated as a regular expression.

For a given request, the processor evaluates the <process> and <associate> tags in the order of their appearance in the file. Many <associate> tags can apply to any given URL, however, preferably only the first matching <process> request is used. If multiple processing for a single request is required, the processing chain can be set with the requestor selector.

As noted earlier, metadata files are not the only way to specify metadata. In addition to HTTP or SOAP headers, the execution environments hosted in the framework (J2EE, NET) can provide their own metadata facilities. ESI also has facilities in the body of the ESI file. The precedence of metadata, from highest to lowest, however, preferably is as follows: ESI or execution environment-specific metadata, HTTP or SOAP Header metadata, file metadata defined in the application programming environment.

The following is an example of how XSLT processing is set up in the programming environment for a simple catalog application:

```
<application>
    <domain>www.mystore.com</domain>
    <path>/catalog </path>
    <origin>origin.mystore.com</origin>
</application>
<process>
    <match type="path" value="/catalog/catalog.html"/>
    <apply>XSLT</apply>
    <input type="code" src="/xslt/catalog.xsl"
        invprop="true"/>
    <input name="name" src="/data/catalog.xml"
        invprop="true"/>
    <md name="vary" value="cookie:usertype"/>
</process>
<associate>
    <match type="path" value="/xslt/*.xsl" regexp="true"/>
    <md name="max-age" value="1d"/>
</associate>
```

```
</associate>
<associate>
    <match type="path" value="/data/catalog.xml"/>
    <md name="max-age" value="6h"/>
</associate>
```

The above example illustrates a number of concepts. In this example, the component www.mystore.com/catalog/catalog.html is composed by applying an XSL stylesheet www.mystore.comlxslt/catalog.xsl to an XML data component www.mystore.com/data/catalog.xml, the XML data is cached for 6 hours, the XSL style sheet is cached for 1 day. Moreover, because the inputs have invprop=true, the catalog.html page will be invalidated as soon as any inputs are invalidated. Multiple versions are cached depending on the value of the cookie called "usertype".

The following is an example for J2EE processing: Although with JESI metadata can be specified in the body of a JSP page, metadata files are still very useful. The following is an example:

```
<application>
    <domain>www.mystore.com</domain>
    <path>/catalog </path>
    <origin>origin.mystore.com</origin>
</application>
<process>
    <match type="path" value="/catalog/catalog.html"/>
    <apply>servlet/2.2</apply>
    <input type="code" src="/servlets/catalog.class"/>
    <md name="vary" value=" header:user-agent:browser:
        version:main"/>
    <md name="max-age" value="30m"/>
</process>
<associate>
    <match type="path" value="/servlets/catalog.class">
    <md name="max-age" value="1d"/>
</associate>
```

This metadata file specifies how /catalog/catalog.html is produced by running /servlets/catalog.class. In this example, the source servlet is cached for 1 day, but the result can only cached for 30 min. and varies by User-Agent, specifically by the main version of the browser.

J2EE is a complex environment, and an implementation of the present invention may support a range of J2EE technologies. The following are some J2EE technologies that developers may find useful on the edge: JSPs/servlets/JavaBeans for presentation layer, JDBC, RMI-JRMP and RMI-IIOP to access EJBs running at the origin, and JAXP and other Web Services Pack interfaces for creating Web Services. In an illustrative embodiment, the origin may expose its EJBs as Web Services and the edge accesses these Services over SOAP.

To make the development of J2EE applications easier, the inventive platform preferably also provides the following functionality: processing of metadata specified in the relevant J2EE deployment files, such as web.xml and others, transparent synchronization of Session and Application objects between origin and the edge, and modifications of <jsp:include> and <jsp:forward> tags to include the attribute control that can specify all the metadata attributes discussed above, similar to the one specified in the JESI (see below). JESI (JSR 128) is a custom JSP tag library that currently runs on the edge and generates ESI. Additional details can be found at the following URL http://jcp.org/jsr/detail/128.jsp, http://www.edge-delivery.org/jesit tag lib 1-0.html.

Using the inventive architecture, preferably there are two implementations of JESI: JESI-Origin and JESI-Edge, both supporting an interface similar to the current JESI interface. JESI-Origin runs on the origin just like current JESI and generates ESI. In addition to its current functionality, the <jesi:fragment>, <jesi:template>, and <jesi:control> tags all have an attribute called runat, with the possible values being origin and edge. If runat=edge, then the corresponding fragment or template code runs on the edge. Otherwise, the code runs at the origin and an <esi:include> will be generated. JESI-Edge supports caching results of JSP code fragment execution. For example, the developer is able to specify that a JSP page has to be executed every time, but an expensive piece of code (perhaps the one doing a remote SOAP call) should only be run periodically, e.g., once an hour.

The following is a simple example of using ESI to combine several fragments produced by different sources:

<html>

<!—various template formatting is omitted.-->

<esi:include src="frag1.xml" ttl="2h"/>

<!—the XML fragment may contain a reference to the corresponding XSL file-->

<esi:include src="frag2.jsp" control="no-store" />

<!—the result of the JSP page will not be stored-->

<esi:include src="http://othersite.com/foo.frag3.aspx" ttl="3h" />

<!—including of an ASP.NET page from another site-->

</html>

Of course, a metadata file can be used to provide a lot more metadata for the fragments or the resulting page, just like in the previous examples.

As noted above, security is an integral part of the framework. The two relevant aspects of security are authentication and authorization. Authentication in the framework can happen either at the edge or at the origin. The way the user is authenticated is application-dependent, but an authenticated user preferably gets a special cookie, e.g., EAUTH. The name of the cookie can be changed through metadata. The cookie preferably contains, in an encrypted form: the list of tokens that specifies the permissions associated with the user, a timestamp of when the cookie was set, and (optionally) a timestamp of when the cookie expires. Authorization can also happen either on the edge or at the origin, but most commonly, it happens on the edge. For those components that require authorization, a metadata attribute of type authorize can be set to the list of authorized tokens <md type="authorize" value="tok1;tok2;tok3 . . . " />.

When the user requests a component, users tokens are matched against component's tokens. Various matching mechanisms can be deployed; a default option is to simply declare a match if any component token matches any user token. The origin can invalidate certain basic or derived components by using a preferably SOAP-based invalidation protocol, which is described below An invalidation feature provided by the mechanism is invalidation propagation. The basic idea behind invalidation propagation is simple. If a basic component is invalidated, it may be necessary to invalidate all or some components derived from it. The same is true when the component has simply expired, and a new version has been retrieved from the origin. With invalidation propagation, the developer does not need to invalidate the derived components separately. Invalidation propagation is applied recursively.

It is not always the case that the invalidation of a basic component must cause the derived component needs to be invalidated as well. To specify the dependency, an <input> tag has an attribute invprop, with the possible values being true and false (default). Only if invprop=true, invalidation propagation is applied.

The following specifies an illustration edge invalidation protocol using SOAP ("EIS"). It provide a means of communicating cache invalidation messages from a client to a known surrogate server, accommodates both local surrogates ("reverse proxies") and distributed networks of surrogates (content delivery networks), provides functional backwards compatibility with ESI Invalidation messages, and makes it easy for SOAP-aware applications to generate invalidations. According to the protocol, EIS communication takes place between a EIS Client and an EIS Server. An EIS Client is typically an authoritative Web server, or some entity acting on its behalf. Normally, this means that the processes responsible for generating, updating and maintaining Web content will be EIS Clients. EIS Servers might be individual surrogates, or they might be a device acting on behalf of a number of surrogates, in which case the EIS Server takes responsibility for delivering the invalidation to them. Typically, locally administered surrogates will be contacted individually, while a larger network of remote surrogates, such as those in a CDN, will provide a gateway that acts as the EIS Server. The semantics of EIS messages are designed to accommodate both of these deployment scenarios.

An EIS transaction takes place in the following steps: the EIS Client generates and sends an Invalidation Message to the EIS Server, and the EIS Server processes the message, and sends back either an EIS Response Message, or a Fault. If a Fault is generated, it implies that no invalidations have taken place; that is, the Invalidation message is evaluated as a whole and checked for conditions that may raise a fault before any cached entities are invalidated. This preserves any transactional aspects of the Invalidation Message. Preferably, EIS uses SOAP 1.1 including the RPC mechanism, section 5 encoding and its default HTTP binding to define the format of messages and transport them. Future versions of SOAP, and alternative bindings, may be used according to the version negotiation mechanisms that are defined therein. It is anticipated that EIS Server's identity will typically be statically configured in the client as a URI, although mechanisms such as UDDI may be used to discover it.

The following describes one method, 'invalidate', which is composed of an Invalidate (request) message, and an InvalidateResponse message. The Invalidate message is the RPC request that the EIS Client sends to the EIS Server. It may contain the following parameters;

username
optional; string
The username parameter identifies the party making the invalidation. It is optional, but EIS server implementations may generate an InvalidAuthentication fault if they wish to require it, or the supplied value is unknown.

password
optional; string
The password parameter is the plaintext password associated with the username, to authenticate the user to the EIS server. As with username, if it is missing or incorrect, an InvalidAuthentication fault may be generated by those implementations that wish to require it.

targets
   optional; array of strings
   The targets parameter is an optional array of one or more URIs that identify the systems to which the invalidations are targeted. This may be useful in cases when an EIS server represents more than one surrogate or network of surrogates. The values of the URIs should be generated by the EIS Server's administrators, and may be any valid URI. EIS' behavior is undefined when the targets parameter is not present; server implementations may choose to nominate a default target, interpret the message as having no target, or assume the use of all targets available.
   The targets parameter applies to all invalidations sent in an invalidation message.

selectors
   required; array of selectors
   The selectors parameter contains an array of selectors, allowing more than one URI or group of URIs to be invalidated in a single SOAP message. Each selector is conceptually a separate invalidation, and specifies an array of modifiers that, when evaluated, identify the cache entities to be invalidated from cache by that selector. Modifiers take the form of an array containing two items, with each modifier refining the scope of cache entities identified by that selector. The first item is a string name, which identifies the modifier type, while the second is a string value, interpreted according to that modifier's semantics to describe a set of entities to be invalidated.
   Representative defined modifiers and appropriate values are:
      uri—URI as defined by RFC2396. Only matches when the selector URI and the cached request-URI are equivalent.
      uriprefix—URI as defined by RFC2396. This matches when there is a leftmost match between the selector URI and the cached request-URI.
      uriregex—regular expression. Matches when the regular expression is found in the cached request-URI.
      etag—an ETag as defined in RFC2616. This matches cached entities that have an equivalent ETag (including whether it is weak or strong).
      vary—HTTP request header. This matches entities that were cached using server-side content negotiation as specified.
      method—HTTP request method, as defined in RFC2616. This matches entities that were cached using the method as part of the cache index.
      reqbodyregex—regular expression. This matches when the regular expression is found in the cached request body (e.g., on a POST operation).
   All URI matching preferably takes into consideration the encoding rules in RFC2396, i.e., URIs should be normalized before comparison. Server implementations are only required to support the 'uri' modifier; preferably, all others are optional. The ClientModifierNotSupported Fault should be used to communicate what modifiers are supported by an implementation. Selectors are evaluated with an implicit 'and'; that is, only entities that match all specified modifiers will be considered to match the selector containing them. For example, [('uri', 'http://www.example.com/foo.gif'), ('etag'), ('abcdef')] invalidates only the entity cached as http://www.example.com/foo.gif that has an eTag of 'abcdef'. Similarly, the representative expression [('uriprefix', 'http://www.example.com/'), ('method', 'POST')] invalidates all objects on the site http://www.example.com that contain the method POST as part of the cache index. Consequently, modifiers may cancel each other out, leading to the selector matching no entities. For example, the expression [('uri', 'http://www.example.com/foo/baz.html'), ('uriprefix', 'http://www.example.com/bar/')] cannot match any entity.

Of course, the above examples are merely illustrative and are not to be taken to limit the invention.

The InvalidateResponse message is an RPC response sent from the EIS Server to the EIS Client. Preferably, it takes the form of a data structure (struct) with one defined entry, selectorResults. This is an array, the ordering of which corresponds to the selectors array in the invalidate message; each selector submitted has a related member in this array.

Each array member is a struct preferably containing the following keys and associated values;
      estCompletionTime—date/time; optional. Server implementations may give an estimate of when the invalidation will be complete, if they have such information, and it is not immediate. If supplied, this field should be considered advisory only.
      numInvalidated—integer; optional. Server implementations may supply the number of cached entities invalidated, if such information is available. A zero value implies that the selector did not match any entities in cache.
      selectorID—string; required. Uniquely identifies the selector, for future reference (e.g., support). The value must be guaranteed by the EIS server to be unique among all other such values returned.

Server implementations may make additional per-selector information available by adding new dictionary keys.

Faults can be generated upon a number of conditions, and imply (as stated above) that no invalidations have taken place. The following faults are defined by EIS:

Client.InvalidAuthentication
   This fault is generated when the username and/or password parameters are missing or incorrect, and the Server implementation requires them.

Server.TargetNotAvail able
   This fault is generated when any unknown or unsupported target is specified.

Client.InvalidModifierValue
   Server implementations should generate this Fault if an incorrectly formed modifier value is encountered (e.g., not a valid URI for 'uri' modifiers, or not a valid regular expression for 'uriregex' modifiers).

Client.ModifierNotSupported
   Because support for many modifiers is optional, this Fault allows server implementations to reject invalidation messages that contain modifiers that they do not support or recognize. This fault's detail element must have a 'supportedModifiers' child element, containing an array of modifier names that the server implementation supports.

Client. RequiredModifierMissing
   Some server implementations may require certain modifiers to be present in every selector; for example, some URI modifier (either plain uri, uriprefix or uriregex). This Fault allows them to enforce these restrictions.

This Fault's detail element must have an 'alternate-Modfiers' child element, containing an array of one or more alternate modifiers whose presence will satisfy the requirement.

For example, if the array ['uri', 'uriprefix', 'uriregex' ] is returned with the Fault, the presence of any one of these modifiers in each selector will satisfy the requirement.

Client. RequestDenied

This Fault should be generated when the Server refuses to accept the invalidations for reasons of policy, e.g., the client has used a quota of invalidations, or due to other factors.

Preferably, EIS authentication is implemented in conjunction with SSL or TLS encryption. SOAP module-based encryption mechanisms may provide an alternative when they become available.

In summary, any commercial CDN service that provides web content, media streaming and applications delivery may be used to implement the above-described functionality, or the functionality may be provided in a product, e.g., a software package. In a representative embodiment, the CDN service provider may also have the ability to provide content delivery within an enterprise computing environment. As used herein, an "enterprise environment" refers to some defined set of networks, machines, software, and control functionality. A representative enterprise may be a corporate intranet. A given enterprise typically includes locations that are geographically dispersed but that are interconnected over a given network (e.g., a LAN, WAN or the like). The CDN provider may also have the ability to map and load balance users inside the enterprise as part of the global ICDN, to fetch content from inside the firewall, to collect log information, to deploy software, to distribute live streams, and to provide other ICDN functionality useful in the enterprise environment.

The following is additional background on ESI, which is a preferred way of implementing the dispatcher language used in the inventive programming environment. ESI is a simple markup language used to define the business logic for how Web page components are dynamically assembled and delivered from the edge of the Internet. More specifically, ESI provides a way for a content provider to express the business logic of how an ICDN should be assembling the content provider's pages. Thus, ESI is a common language that the content provider can use and the CDN service provider can process for content assembly, creation, management and modification. ESI provides a mechanism for assembling dynamic content transparently across application server solutions, content management systems and content delivery networks. It enables a content provider to develop a Web application once and choose at deployment time where the application should be assembled, e.g., on a content management system, an application server, or the CDN, thus reducing complexity, development time and deployment costs. ESI is described in detail at http://www.edge-delivery.org/spec.html. ESI provides the content provider/ developer with the following capabilities:

Inclusion—a central ESI feature is the ability to fetch and include files that comprise a web page, with each file preferably subject to its own configuration and control, namely, cacheability properties, refresh properties, and so forth. An <esi:include> tag or similar construct may be used for this purpose. An include statement can have a time-to-live (TTL) attribute that specifies a time-to-live in cache for the included fragment.

Environmental variables—ESI supports use of a subset of standard CGI environment variables such as cookie information. These variables can be used inside ESI statements or outside ESI blocks. An <esi:vars> tag or similar construct may be used for this purpose.

Conditional inclusion—ESI supports conditional processing based on Boolean comparisons or environmental variables. An <esi:choose> tag or similar construct may be used for this purpose.

Exception and error handling—ESI allows specification of alternative pages and for default behavior in the event that an origin site or document is not available. An <esi:try> tag or similar construct may be used to specify such alternative processing, e.g., when a request fails. Further, it provides an explicit exception-handling statement set.

ESI provides a number of features that make it easy to build highly dynamic Web pages, namely, coexistence of cacheable and non-cacheable content on the same page, separation of page assembly logic and delivery (so that complex logic required to select the content itself is separated from the delivery of that content), the ability to perform ESI processing recursively on components themselves, and the ability to perform logic (e.g., certain personalization and conditional processing) on an edge server. The ESI language recognizes the fact that many pages have dynamic and often non-cacheable content. By breaking up Web pages into individual components, each with different cache policies, ESI makes it easy to speed up the delivery of dynamic pages. Only those components that are non-cacheable or need updating are requested from the origin server. This results in a considerable speed improvement over the prior art of centralized assembly and delivery of dynamic content.

Recursive ESI logic may be used to separate page logic from content delivery. Any ESI fragment can, in turn, contain other fragments, etc. In particular, an non-cacheable dynamic fragment can contain include functionality, e.g., an <esi:includes> tag set, to point to cacheable sub-fragments. Personalization is provided, e.g., using an <esi:choose> tag, that allows content providers to include different content fragments based on: user-agent and other header values, cookie values, a user's location, a user's connection speed, and the like. Finally, many different variables (e.g., cookie-based variables, query-string, accept_language, etc.) can be substituted into the text of the page, which makes many previously non-cacheable personalized pages easily deliverable from the edge. These variables can also be used to evaluate conditional logic.

Although the invention has been described as leveraging what has been described as ESI, this is not a requirement of the invention. Any convenient server side scripting language or other server-based functionality may be used to fire include(s) identified in a given container or content fragment, to evaluate conditional expressions, to perform variable substitutions, and the like. Generalizing, the mechanism of the present invention may be used with any generalized server-based functionality including, without limitation, ESI, SSI, XSSI, JSP, ASP, PHP, Zope, ASP.NET, Perl, and many others.

Having described our invention, what we now claim is as follows.

The invention claimed is:

1. A method performed on an edge server in a content delivery network, comprising:

providing the edge server with a structured document, the structured document comprising a first pair of tars identifying an application and defining a request URL domain and path that map to the application, a second pair of tags identifying at least one rule for composing an instance of the application on the edge server using a set of one or more components, each of the components being defined in the structured document by a URI-addressable path and being one of: a presentation component, a code component and a data component, and a third pair of tags identifying a property of a given presentation, code or data component;

responsive to receipt at the edge server of a request to the request URL domain and path, evaluating the request URL domain and path to determine whether the edge server has a structured document associated therewith;

if the edge server has a structured document associated therewith, retrieving the structured document;

parsing the first, second and third pair of tags in the structured document to compose the instance of the application;

generating a response to the request using the instance of the application; and delivering the response to the client.

2. The method as described in claim 1 wherein a given component in the set of one or more components has a cacheability profile defined by the property in the structured document.

3. The method as described in claim 1 wherein a given component in the set of one or more components has a deployment profile defined by the property in the structured document.

4. The method as described in claim 1 wherein a given component in the set of one or more components has a invalidation profile defined by the property in the structured document.

5. The method as described in claim 1 wherein a given component in the set of one or more components has a security profile defined by the property in the structured document.

6. The method as described in claim 1 wherein the instance of the application is composed by combining first and second presentation components and generating a third, derived presentation component.

7. The method as described in claim 1 wherein the instance of the application is composed by using a code component to generate a derived presentation component.

8. The method as described in claim 1 wherein the instance of the application is composed by linking a first code component with a second code component to generate a third, derived code component.

9. The method as described in claim 1 wherein the instance of the application is composed by using a code component to process a data component to generate a derived processing component.

10. The method as described in claim 1 wherein the instance of the application is composed by using a code component to process a data component to generate a derived data component.

11. The method as described in claim 1 wherein the presentation components are markup language fragments.

12. The method as described in claim 1 wherein the data components are selected from a set of data components consisting essentially of XML files and native database formats.

13. The method as described in claim 1 wherein the code components are selected from a set of code components consisting essentially of XSLT style sheets, and Java servlets and beans.

14. The method as described in claim 1 wherein the set of one or more components comprises a plurality of components and a subset of the components is homogenous.

15. The method as described in claim 1 wherein the set of one or more components comprises a plurality of components and a subset of the components is heterogenous.

16. The method as described in claim 1 wherein the structured document is an XML document.

17. The method as described in claim 1 wherein the rule also defines a cacheability profile for a result derived by applying a given component.

18. The method as described in claim 17 wherein the result is derived by applying a given presentation component to a given code component.

19. An apparatus operating in a content delivery network, comprising:

a processor;

a data store for receiving and storing a structured document, the structured document comprising a first pair of tags identifying an application and defining a request URL domain and path that map to the application, a second pair of tags identifying at least one rule for composing an instance of the application on the edge server using a set of one or more components, each of the components being defined in the structured document by a URI-addressable path and being one of: a presentation component, a code component and a data component, and a third pair of tags identifying a property of a given presentation, code or data component;

code executable on the processor and responsive to receipt of a request to the request URL domain and oath for evaluating the first, second and third pair of tags in the structured document to compose the instance of the application; and code executable on the processor for generating a response to the request using the instance of the application.

* * * * *